United States Patent
Liu

(10) Patent No.: US 12,511,088 B2
(45) Date of Patent: Dec. 30, 2025

(54) DISPLAY METHOD AND DISPLAY APPARATUS

(71) Applicant: VIVO MOBILE COMMUNICATION CO., LTD., Dongguan (CN)

(72) Inventor: Wei Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 202 days.

(21) Appl. No.: 18/516,932

(22) Filed: Nov. 21, 2023

(65) Prior Publication Data

US 2024/0086136 A1   Mar. 14, 2024

Related U.S. Application Data

(63) Continuation of application No. PCT/CN2022/095651, filed on May 27, 2022.

(30) Foreign Application Priority Data

May 28, 2021 (CN) .......................... 202110592516.X

(51) Int. Cl.
*G06F 3/14* (2006.01)
*G06V 20/62* (2022.01)
*G06V 30/19* (2022.01)

(52) U.S. Cl.
CPC .......... *G06F 3/1423* (2013.01); *G06V 20/635* (2022.01); *G06V 30/19093* (2022.01); *G06V 2201/02* (2022.01)

(58) Field of Classification Search
CPC .......................... G06F 3/048–05; G06V 20/635
See application file for complete search history.

(56) References Cited

U.S. PATENT DOCUMENTS

2018/0160157 A1* 6/2018 Kim ................ H04N 21/488
2021/0019369 A1* 1/2021 Sharma ............. G06F 40/263

FOREIGN PATENT DOCUMENTS

| CN | 102148048 A | 8/2011 | |
|---|---|---|---|
| CN | 104427263 A | 3/2015 | |
| CN | 104883622 A * | 9/2015 | ......... H04N 21/4884 |
| CN | 106034254 A | 10/2016 | |

(Continued)

OTHER PUBLICATIONS

English Translation of CN 104883622-A, published on Sep. 2, 2015 (Year: 2015).*

(Continued)

*Primary Examiner* — Daniel Rodriguez
(74) *Attorney, Agent, or Firm* — IPX PLLC

(57) ABSTRACT

A display method and an electronic device are provided. The method includes: when a first interface includes a first playback picture, determining whether a first character string satisfies a target condition. The first playback picture includes the first character string, and the first playback picture is a playback picture of a target video at a first playback node. The method further includes when the first character string satisfies the target condition, displaying a second character string on a second interface. A second playback picture includes the second character string, and the second playback picture is a playback picture of the target video at a second playback node. The second playback node is a previous playback node of the first playback node.

12 Claims, 6 Drawing Sheets

(56) References Cited

FOREIGN PATENT DOCUMENTS

| | | | | | |
|---|---|---|---|---|---|
| CN | 107659847 | A | | 2/2018 | |
| CN | 104735549 | B | * | 7/2018 | ......... H04N 21/4316 |
| CN | 109168040 | A | | 1/2019 | |
| CN | 109819301 | A | | 5/2019 | |
| CN | 110062281 | A | | 7/2019 | |
| CN | 110636365 | A | | 12/2019 | |
| CN | 110971847 | A | | 4/2020 | |
| CN | 111542817 | A | | 8/2020 | |
| CN | 112351329 | A | * | 2/2021 | ............. H04N 5/278 |
| CN | 112822539 | A | | 5/2021 | |
| CN | 112988005 | A | * | 6/2021 | ........... G06F 3/0484 |
| CN | 113347478 | A | | 9/2021 | |
| CN | 120276636 | A | * | 7/2025 | ........... G06F 40/106 |
| JP | 2002342311 | A | | 11/2002 | |
| JP | 2004032607 | A | * | 1/2004 | |
| JP | 2007109240 | A | * | 4/2007 | ........ H04M 1/72409 |
| JP | 2019176388 | A | | 10/2019 | |
| KR | 20060067347 | A | * | 6/2006 | ............... H04N 5/76 |

OTHER PUBLICATIONS

International Search Report issued in corresponding International Application No. PCT/CN2022/095651, mailed Sep. 1, 2022, 6 pages.
First Office Action issued in related Chinese Application No. 202110592516.X, mailed Jun. 6, 2022, 8 pages.

* cited by examiner

DISPLAY METHOD AND DISPLAY APPARATUS

CROSS-REFERENCE TO RELATED APPLICATIONS

This application is a continuation of International Application No. PCT/CN2022/095651, filed on May 27, 2022, which claims priority to Chinese Patent Application No. 202110592516.X, filed on May 28, 2021. The entire contents of each of the above-referenced applications are expressly incorporated herein by reference.

TECHNICAL FIELD

This application relates to the field of communication technologies, and specifically, to a display method and a display apparatus.

BACKGROUND

With the development of electronic devices, a video playback function of an electronic device is more and more powerful, and a user can watch a video file anytime and anywhere by using the video playback function.

At present, in a process of a user watching a video file by using an electronic device, when a video picture displays text describing a plot (for example, a summary of a previous plot and a plot analysis), the user may not have finished browsing the text, while the video picture has been switched due to a reason such as a fast video playback speed. As a result, the user cannot understand the plot. In this case, if the user wants to browse the text again, the user usually needs to manually drag a video progress bar to trigger the electronic device to rewind to the video picture displaying the text, and then browses again.

However, because a total length of the video progress bar displayed by the electronic device is usually fixed, different video files may have different total playback duration. To be specific, a progress bar per unit length may correspond to different video duration. When the user drags progress bars of a same length, the electronic device fast rewinds different video duration. As a result, the user cannot accurately control a video playback progress, and the user needs to drag the video progress bar back and forth, resulting in cumbersome operations and low efficiency when the user browses the video file.

SUMMARY

Embodiments of this application are intended to provide a display method and a display apparatus.

According to a first aspect, an embodiment of this application provides a display method. The method includes: in a case that a first interface includes a first playback picture, determining whether a first character string satisfies a target condition, where the first playback picture includes the first character string, and the first playback picture is a playback picture of a target video at a first playback node; and in a case that the first character string satisfies the target condition, displaying a second character string on a second interface, where a second playback picture includes the second character string, and the second playback picture is a playback picture of the target video at a second playback node, where the second playback node is a previous playback node of the first playback node.

According to a second aspect, an embodiment of this application provides a display apparatus. The display apparatus includes: a determining module and a display module. The determining module is configured to: in a case that a first interface includes a first playback picture, determine whether a first character string satisfies a target condition, where the first playback picture includes the first character string, and the first playback picture is a playback picture of a target video at a first playback node. The display module is configured to: in a case that the determining module determines that the first character string satisfies the target condition, display a second character string on a second interface, where a second playback picture includes the second character string, and the second playback picture is a playback picture of the target video at a second playback node, where the second playback node is a previous playback node of the first playback node.

According to a third aspect, an embodiment of this application provides an electronic device, where the electronic device includes a processor, a memory, and a program or instructions stored in the memory and capable of running on the processor, where when the program or the instructions are executed by the processor, the steps of the method according to the first aspect are implemented.

According to a fourth aspect, an embodiment of this application provides a readable storage medium, where the readable storage medium stores a program or instructions, and when the program or the instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

In the embodiments of this application, in a case that the first interface includes the first playback picture, the display apparatus may determine whether the first character string satisfies the target condition. The first playback picture includes the first character string, and the first playback picture is the playback picture of the target video at the first playback node. Then, in a case that the first character string satisfies the target condition, the display apparatus may display the second character string on the second interface. The second playback picture includes the second character string, and the second playback picture is the playback picture of the target video at the second playback node. The second playback node is the previous playback node of the first playback node. In the foregoing solution, in a case that a user watches a video on the first interface of the electronic device and misses text related to a plot description, the display apparatus in this application may determine whether the first character string in the first playback picture corresponding to the first playback node satisfies the target condition. In a case that the first character string satisfies the target condition, the display apparatus displays, on the second interface, the second character string in the second playback picture corresponding to the previous playback node of the first playback node. In comparison with the solution in the related art and requiring the user to manually drag a video progress bar to trigger the electronic device to rewind to display the text, the display apparatus in the embodiments of this application may directly display the second character string on the second interface without affecting the playing of the target video on the first interface, which does not require the user to manually drag the video progress bar to trigger the electronic device to rewind to display the second character string. In this way, it is convenient for the user to quickly check a character string related to the plot description, and therefore operations are simple and efficiency is high when the user browses the video file.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that data used in this way is interchangeable in appropriate circumstances such that the embodiments of this application can be implemented in other orders than the order illustrated or described herein. In addition, objects distinguished by "first", "second", and the like are usually of a same type, and the number of the objects is not limited, for example, there may be one or more first objects. In addition, in this specification and claims, "and/or" indicates at least one of connected objects, and the character "/" generally indicates an "or" relationship between associated objects.

The following describes in detail a display method provided in the embodiments of this application by using specific embodiments and application scenarios thereof with reference to the accompanying drawings.

Figure 1:
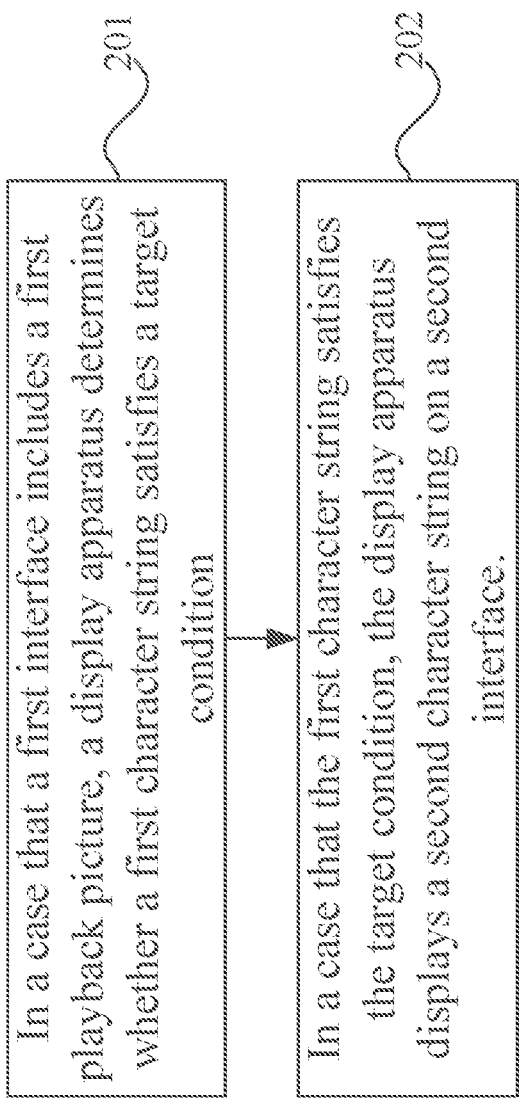
FIG. 1 is a schematic flowchart of a display method according to an embodiment of this application.

FIG. 1 is a schematic flowchart of a display method according to an embodiment of this application, and the method includes step 201 and step 202.

Step 201: In a case that a first interface includes a first playback picture, a display apparatus determines whether a first character string satisfies a target condition.

The first playback picture includes the first character string, and the first playback picture is a playback picture of a target video at a first playback node.

In this embodiment of this application, the first interface may be a playback interface of the target video. For example, the first interface may be displayed in any region of a screen of the display apparatus. For example, the first interface may be an upper region of the screen of the display apparatus, or a lower region of the screen of the display apparatus, or a left region of the screen of the display apparatus, or a right region of the screen of the display apparatus. This is not limited in this embodiment of this application.

In this embodiment of this application, a character in this application may include at least one of the following: a character, a symbol, a letter, and a number. It can be understood that a character string in this application includes at least one character.

It should be noted that the character string in this application is a character string in a playback picture of the target video. For example, the first character string may be a character string describing a plot of the target video.

For example, the display apparatus may identify the playback picture by using an image recognition technology to obtain the character string in the playback picture. For a specific recognition process, reference may be made to the prior art, and details are not described herein.

It should be noted that the target video in this application may be understood as a target video file.

For example, in this embodiment of this application, the target condition includes any one of the following: similarity between the first character string and a second character string is less than a first preset threshold, and a quantity of characters of the first character string is less than a second preset threshold.

In this embodiment of this application, a preset threshold in this application may be set by default by a system, or may be set by a user, which is not limited in this embodiment of this application.

For example, the first preset threshold may be a number (for example, the first preset threshold may be 2), or may be a percentage (for example, the first preset threshold may be 20%), which is not limited in this embodiment of this application.

For example, the second preset threshold may be a positive integer, for example, the second preset threshold may be an integer 10.

Step 202: In a case that the first character string satisfies the target condition, the display apparatus displays the second character string on a second interface.

A second playback picture includes the second character string, and the second playback picture is a playback picture of the target video at a second playback node. The second playback node is a previous playback node of the first playback node.

For example, the second playback node and the first playback node may have a difference of a preset time interval.

In this embodiment of this application, the preset time interval may be set by default by the system, or may be set by the user, which is not limited in this embodiment of this application. For example, the preset time interval may be 1 second(s).

In this embodiment of this application, the first interface and the second interface may be displayed on a same screen, or may be displayed on different screens, which are not limited in this embodiment of this application.

For example, the second interface may be displayed on the first interface in a floating manner. When the user drags the second interface, the second interface may be moved on the first interface along with the dragging operation of the user.

In an example, the second interface may a window.

Figure 2:
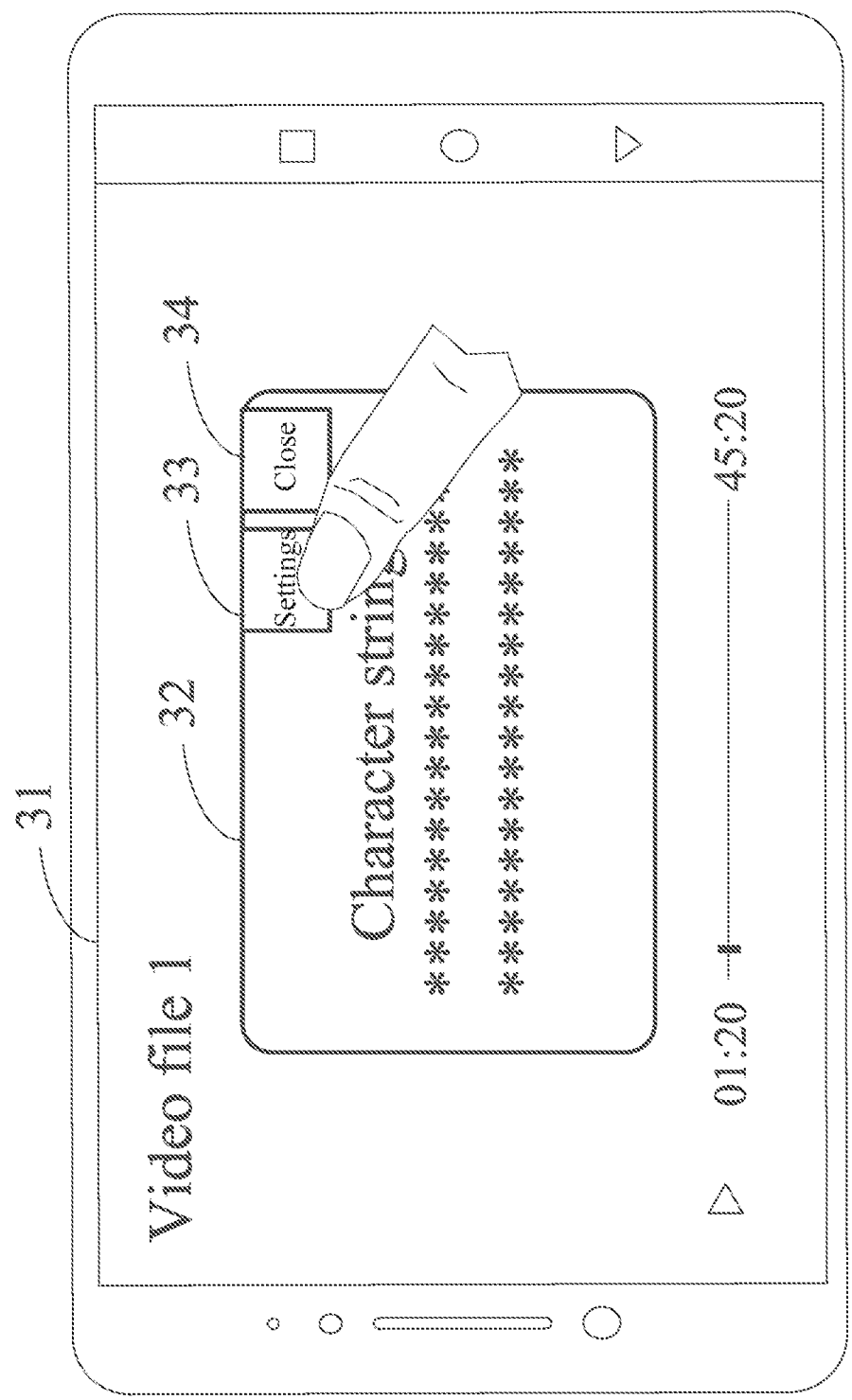
FIG. 2 is a first schematic diagram of an interface to which a display method according to an embodiment of this application is applied.

For example, the similarity ranges from 0% to 100%, 0% indicates the lowest similarity (that is, completely dissimilar), 100% indicates the highest similarity (that is, exactly the same), and the first preset threshold is 20%. As shown in FIG. 2, a mobile phone displays a playback interface 31 of a video file 1. The mobile phone obtains a picture 1 at 01:19 (namely, the second playback node), determines that the picture 1 includes a character string 1, obtains a picture 2 at 01:20 (namely, the first playback node), and determines that the picture 2 includes a character string 2. Then, the mobile phone may compare the character string 2 with the character string 1, and determine that similarity between the character string 2 and the character string 1 is less than 20%. Therefore, the mobile phone may consider that the character string 2 is different from the character string 1, that is, the mobile phone may determine that the character string 2 satisfies the target condition. In this case, the mobile phone may pop up a window 32 (namely, the second interface), and display the character string 1 in the window 32.

For example, in this embodiment of this application, in a case that the display apparatus includes a plurality of screens, and the plurality of screens include a first screen and a second screen, the first screen may include the first interface, and the second screen may include the second interface.

Figure 3:
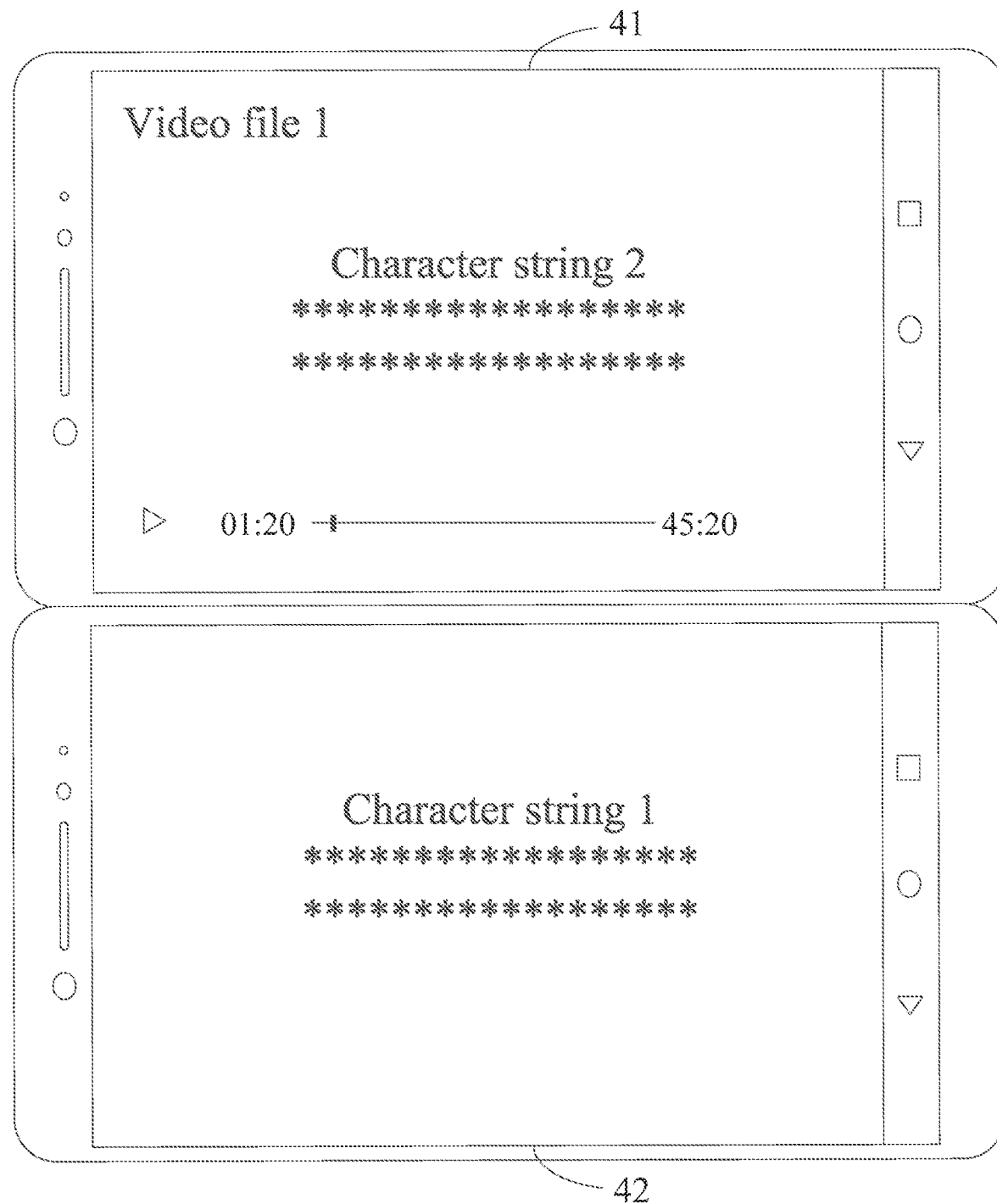
FIG. 3 is a second schematic diagram of an interface to which a display method according to an embodiment of this application is applied.

For example, the mobile phone has the first screen and the second screen. As shown in FIG. 3, the mobile phone displays a playback interface of the video file 1 on a first screen 41. The mobile phone obtains the picture 1 at 01:19 (namely, the second playback node), determines that the picture a includes the character string 1, obtains the picture 2 at 01:20 (namely, the first playback node), and determines that the picture 2 includes the character string 2 Then, the mobile phone may compare the character string 2 with the character string 1, and determine that the similarity between the character string 1 and the character string 2 is 5%, which is less than 20%. In this case, the mobile phone may consider that the character string 1 is different from the character string 2, that is, the mobile phone may determine that the character string 2 satisfies the target condition. In this case, the mobile phone may display the character string 1 on a second screen 42.

It should be noted that, in a case that the display apparatus determines that the first character string does not satisfy the target condition, the display apparatus may not perform another operation, and keep playing the target video only on the first interface.

For example, when the mobile phone plays the video file 1 on the first screen, the mobile phone obtains a picture 3 at a time point A (namely, the second playback node), and determines that the picture 3 includes a character string 3. The character string 3 includes "an accident A is a nuclear reactor accident occurred at a nuclear power plant B". The mobile phone obtains a picture 4 at a time point A+1s (namely, the first playback node), and determines that the picture 4 includes a character string 4. The character string 4 includes "an accident A is a nuclear reactor accident occurred at a nuclear power plant B, and the accident is considered the worst nuclear power accident in history". Then, the mobile phone compares the character string 3 with the character string 4, and determines that similarity between the character string 3 and the character string 4 is 50%, which is greater than 20%. In this case, the mobile phone may consider that only text is added to the character string 4 on the basis of the character string 3, that is, the mobile phone may determine that the character string 4 does not satisfy the target condition. In this case, the display apparatus may keep playing the video file 1 only on the first screen.

It can be understood that during the playing of the target video, the display apparatus may continuously obtain playback pictures according to the preset time interval to continuously determine whether a character string in the playback picture satisfies a condition, and then update and display a character string on the second interface.

For example, after step 202, the method may further include the following step. The display apparatus determines whether a fourth character string satisfies a first condition. In a case that the fourth character string satisfies the first condition, the display apparatus displays the first character string on the second interface. A fourth playback picture includes the fourth character string, and the fourth playback picture is a playback picture of the target video at a fourth playback node. The first playback node is a previous playback node of the fourth playback node. The first condition includes any one of the following: similarity between the fourth character string and the first character string is less than the first preset threshold, and a quantity of characters of the fourth character string is less than the second preset threshold.

For example, in this embodiment of this application, a character string in this application (for example, the first character string or the second character string) is usually a character string corresponding to a playback picture. Therefore, the character string may be understood as an abnormal subtitle. The abnormal subtitle is generally used for describing a plot of the target video, for example, a summary of a previous plot, a plot analysis, and a plot description. However, there are still a large quantity of normal subtitles or bullet screens in the target video. In this case, the display apparatus may detect whether the target video contains the abnormal subtitle in real time, for example, by using the image recognition technology. For a specific detection method, reference may be made to the prior art. This is not limited in this embodiment of this application.

According to the display method provided in this embodiment of this application, in a case that the first interface includes the first playback picture, the display apparatus may determine whether the first character string satisfies the target condition. The first playback picture includes the first character string, and the first playback picture is the playback picture of the target video at the first playback node. Then, in a case that the first character string satisfies the target condition, the display apparatus may display the second character string on the second interface. The second playback picture includes the second character string, and the second playback picture is the playback picture of the target video at the second playback node. The second playback node is the previous playback node of the first playback node. In the foregoing solution, in a case that the user watches a video on the first interface of the electronic device and misses text related to a plot description, the display apparatus in this application may determine whether the first character string in the first playback picture corresponding to the first playback node satisfies the target condition. In a case that the first character string satisfies the target condition, the display apparatus displays, on the second interface, the second character string in the second playback picture corresponding to the previous playback node of the first playback node. In comparison with the solution in the related art and requiring the user to manually drag a video progress bar to trigger the electronic device to rewind to display the text, the display apparatus in the embodiments of this application may directly display the second character string on the second interface without affecting the playing of the target video on the first interface, which does not require the user to manually drag the video progress bar to trigger the electronic device to rewind to display the second character string. In this way, it is convenient for the user to quickly check a character string related to a plot description, and therefore operations are simple and efficiency is high when the user browses the video file.

For example, in this embodiment of this application, after step 202, the method may further include the following step 203.

Step 203: In a case that display duration of the second character string is determined to be greater than or equal to preset duration, the display apparatus cancels the display of the second character string.

In an example, the cancellation of the display the second character string may be understood as closing the second interface. For example, in a case that the second interface is the window, and in a case that the display duration of the second character string is determined to be greater than or equal to the preset duration, the display apparatus may close the window, that is, cancel the display of the second character string.

For example, the preset duration may be set by default by the system, or may be set by the user, which is not limited in this embodiment of this application.

The following provides descriptions by using at least two possible implementations.

In a first possible manner (a system default setting):

for example, the preset duration may be a ratio of a quantity of characters of the second character string to a quantity of characters observable by human eyes within per unit duration.

For example, the preset duration (denoted as t) may be determined by the following formula, and the formula may be expressed as: t=q/10. q is the quantity of characters of the second character string, and 10 is the quantity of characters observable by the human eyes within 1 second. It should be noted that, generally, the human eyes can observe 10 characters within 1 second.

It can be understood that, in a case that the user does not set the preset duration, the display apparatus may automatically determine the ratio of the quantity of characters of the second character string to the quantity of characters observable by the human eyes within per unit duration as the preset duration.

In a second possible manner (a user setting):

for example, in a case that a target control is displayed on the second interface, before step 203, the method may further include the following step A1 to step A4.

Step A1: The display apparatus receives a first input of the user to the target control.

For example, the first input may be: a tap input of the user to the target control, or a voice command inputted by the user, or a specific gesture inputted by the user, which may be determined according to an actual usage requirement and is not limited in this embodiment of this application.

The specific gesture in this embodiment of this application may be any one of a single-tap gesture, a sliding gesture, a drag gesture, a pressure recognition gesture, a long-press gesture, an area change gesture, a double-press gesture, and a double-tap gesture. The tap input in this embodiment of this application may be a single-tap input, a double-tap input, an input of any quantity of taps, or the like, and may be a long-press input or a short-press input.

Step A2: In response to the first input, the display apparatus displays a time input region.

Step A3: The display apparatus receives a second input of the user on the time input region.

For example, the second input is an input of the user inputting time information on the time input region.

Step A4: In response to the second input, the display apparatus determines the preset duration.

Figure 4:
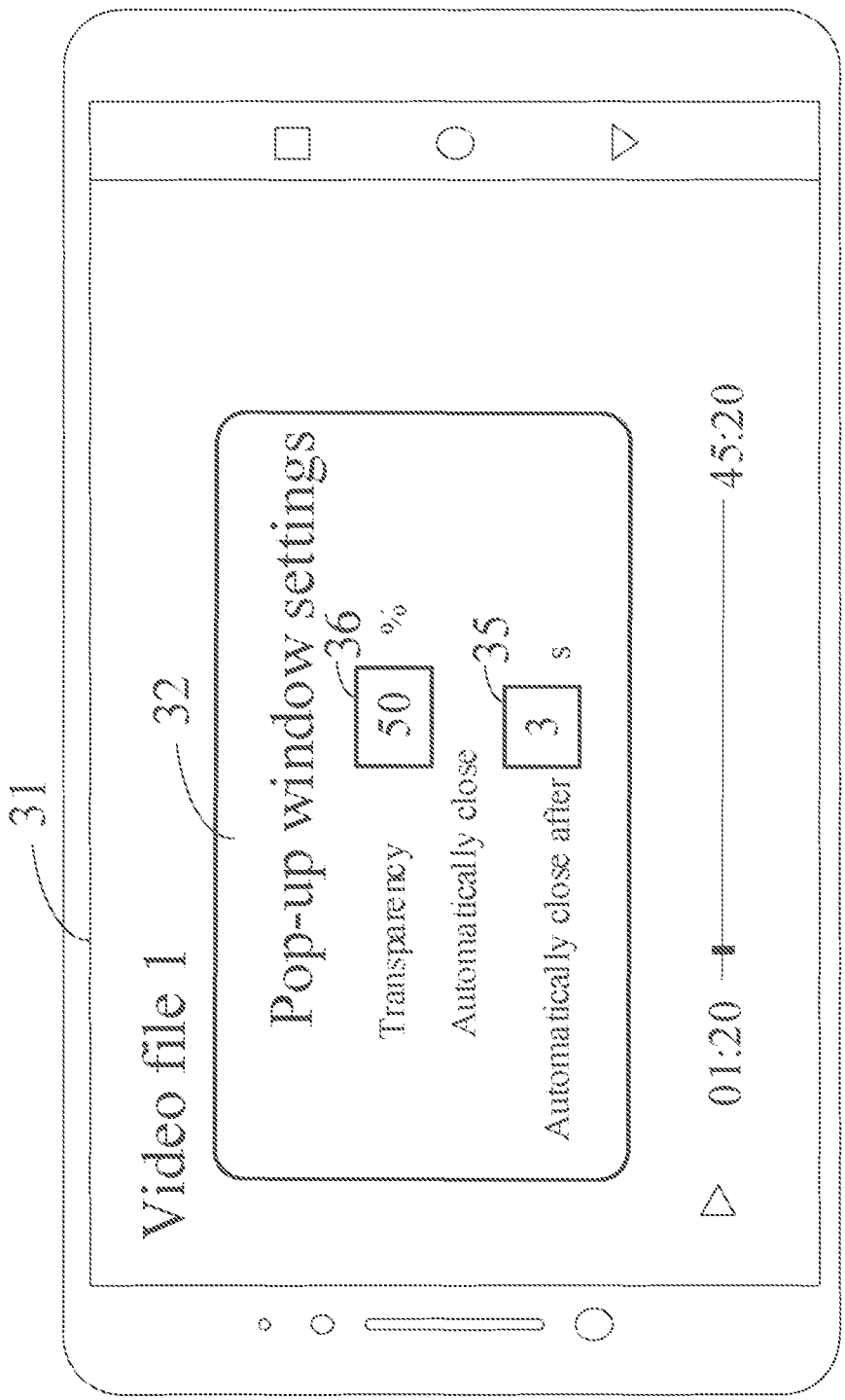
FIG. 4 is a third schematic diagram of an interface to which a display method according to an embodiment of this application is applied.

For example, with reference to FIG. 2, a "setting" key 33 (namely, the target control) and a "close" key 34 are further displayed in the window 32. If the user wants to cancel the display of the character string 1 after 3 seconds, the user may tap the "setting" key 33. In this case, as shown in FIG. 4, the mobile phone may display, in the window 32, a time input box 35 (namely, the time input region) and text "the pop-up layer is automatically closed after S". Then, the user may input a number 3 in the time input box, and the mobile phone determines to automatically close the window 32 after 3 seconds.

It should be noted that, with reference to FIG. 2, if the user closes the window 32 before the mobile phone automatically closes the window 32, the user may tap the "close" key 34, and the mobile phone may directly close the window 32.

In an example, the second interface may be superimposed and displayed on the first interface with a preset transparency. For example, if the preset transparency is denoted as T1, a value range of T1 may be 0%<T1<100%. In addition, the second interface may be displayed on the first interface with high brightness or low brightness, which is not limited in the present disclosure.

For example, the preset transparency may be set by default by the system, or may be set by the user, which is not limited in this embodiment of this application.

For example, with reference to FIG. 2, after the user taps the "setting" key 33, as shown in FIG. 4, the mobile phone may further display a transparency input box 36 in the window 32. If the user wants the window 32 to be superimposed and displayed on the playback interface 31 with a transparency of 50%, the user may input 50 in the transparency input box 36. In this case, the mobile phone may display the window 32 on the playback interface 31 with the transparency of 50%.

The display method provided in this embodiment of this application may be applied to a scenario of alleviating a workload of the display apparatus. In a case that the display duration of the second character string is greater than or equal to the preset duration, the display apparatus may cancel the display of the second character string, so that the display apparatus does not need to always display the second character string, thereby alleviating the workload of the display apparatus.

For example, in this embodiment of this application, in a case that the second interface includes a third character string, step 202 may include the following step 202a or step 202b.

Step 202a: The display apparatus displays the second character string on the second interface and cancels display of the third character string.

Step 202b: The display apparatus displays the second character string on the second interface and maintains display of the third character string.

A third playback picture includes the third character string, the third playback picture is a playback picture of the target video at a third playback node, and the third playback node is a previous playback node of the second playback node.

For example, the third playback node and the second playback node may have a difference of a preset time interval.

It can be understood that, in a case that the first character string is determined to satisfy the target condition, the display apparatus may cancel the display of the third character string on the second interface and display the second character string, that is, update the third character string to the second character string. In some alternative embodiments, in a case that the first character string is determined to satisfy the target condition, the display apparatus may display the second character string on the second interface and maintain the display of the third character string, that is, display the third character string in combination with the second character string.

For example, the mobile phone displays a playback interface of the video file 1. The mobile phone obtains the picture 3 at 01:18 (namely, the third playback node), determines that the picture 3 includes the character string 3, obtains the picture 1 at 01:19 (namely, the second playback node), and determines that the picture 1 includes the character string 1. Then, the mobile phone may compare the character string 1 with the character string 3, and determine that similarity between the character string 1 and the character string 3 is 1%. The similarity is less than 20%. Therefore, the mobile phone may consider that the character string 1 is different from the character string 3, that is, the mobile phone may determine that the character string 3 satisfies the target condition. In this case, the mobile phone may pop up a window (namely, the second interface), and display the character string 3 in the window. In a case that the mobile phone obtains the picture 2 at 01:20 (namely, the first playback node), and determines that the picture 2 includes the character string 2, the mobile phone may compare the character string 2 with the character string 1, and determine that the similarity between the character string 2 and the character string 1 is 5%. The similarity is less than 20%. Therefore, the mobile phone may consider that the character string 2 is different from the character string 1, that is, the mobile phone may determine that the character string 2 satisfies the target condition. In this case, the mobile phone may display the character string 3 in combination with the character string 1 in the window.

In an example, in a case that the mobile phone displays the character string 3 in combination with the character string 1 in the window, if a sum of a quantity of characters of the character string 3 and a quantity of characters of the character string 1 is greater than or equal to a target threshold (for example, 150), then the mobile phone may cancel the display of the character string 3 in a case that display duration of the character string 3 is greater than or equal to the preset duration. It should be noted that display duration of the window may be a sum of remaining display duration corresponding to the character string 3 and displayable duration of the character string 1 after the character string 3 is displayed in combination with the character string 1.

The display method provided in this embodiment of this application may be applied to flexibly process a scenario in which a character string already exists in the second display region. When the character string already exists in the second display region, the display apparatus may update and display the existing character string as a new character string, or may display the existing character string in combination with the new character string, so that a process of the display of the character string is more flexible.

For example, in this embodiment of this application, after step 202, the method may further include the following step. The display apparatus generates a target document. The document includes the second character string. In this way, after the target video is played, the user may further edit the second character string (for example, copy and paste or modify), to facilitate the user to organize and analyze content in the video.

It should be noted that the display method provided in this embodiment of this application may be performed by a display apparatus or a control module for performing the display method in the display apparatus. In an embodiment of this application, the display apparatus provided in this embodiment of this application is described by using an example in which the display apparatus performs the display method.

Figure 5:
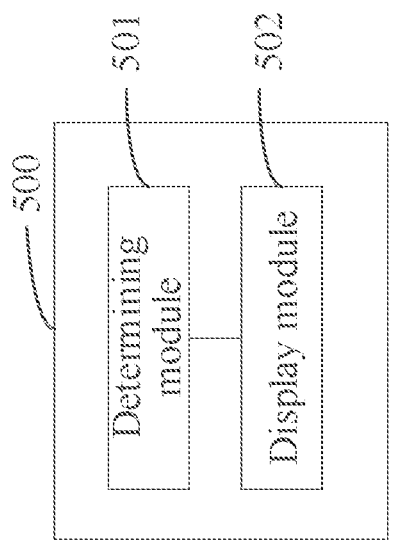
FIG. 5 is a schematic structural diagram of a display apparatus according to an embodiment of this application.

FIG. 5 is a possible schematic structural diagram of a display apparatus according to an embodiment of this application. As shown in FIG. 5, the display apparatus 500 includes: a determining module 501 and a display module 502. The determining module 501 is configured to: in a case that a first interface includes a first playback picture, determine whether a first character string satisfies a target condition, where the first playback picture includes the first character string, and the first playback picture is a playback picture of a target video at a first playback node. The display module 502 is configured to: in a case that the determining module 501 determines that the first character string satisfies the target condition, display a second character string on a second interface, where a second playback picture includes the second character string, and the second playback picture is a playback picture of the target video at a second playback node. The second playback node is a previous playback node of the first playback node.

For example, the target condition includes any one of the following: similarity between the first character string and the second character string is less than a first preset threshold, and a quantity of characters of the first character string is less than a second preset threshold.

For example, the second interface includes a third character string. The display module 502 is further configured to: in a case that the determining module 501 determines that the first character string satisfies the target condition, perform a target operation. The target operation includes any of the following: canceling display of the third character string on the second interface, and maintaining the display of the third character string on the second interface. A third playback picture includes the third character string, and the third playback picture is a playback picture of the target video at a third playback node. The third playback node is a previous playback node of the second playback node.

For example, the display module 502 is further configured to: in a case that display duration of the second character string is determined to be greater than or equal to preset duration, cancel the display of the second character string.

For example, in a case that the display apparatus includes a plurality of screens, and the plurality of screens include a first screen and a second screen, the first screen includes the first interface, and the second screen includes the second interface.

According to the display apparatus provided in this embodiment of this application, in a case that the first interface includes the first playback picture, the display apparatus may determine whether the first character string satisfies the target condition. The first playback picture includes the first character string, and the first playback picture is the playback picture of the target video at the first playback node. Then, in a case that the first character string satisfies the target condition, the display apparatus may display the second character string on the second interface. The second playback picture includes the second character string, and the second playback picture is the playback picture of the target video at the second playback node. The second playback node is the previous playback node of the first playback node. In the foregoing solution, in a case that a user watches a video on the first interface of the electronic device and misses text related to a plot description, the display apparatus in this application may determine whether the first character string in the first playback picture corresponding to the first playback node satisfies the target condition. In a case that the first character string satisfies the target condition, the display apparatus displays, on the second interface, the second character string in the second playback picture corresponding to the previous playback node of the first playback node. In comparison with the solution in the related art and requiring the user to manually drag a video progress bar to trigger the electronic device to rewind to display the text, the display apparatus in the embodiments of this application may directly display the second character string on the second interface without affecting the playing of the target video on the first interface, which does not require the user to manually drag the video progress bar to trigger the electronic device to rewind to display the second character string. In this way, it is convenient for the user to quickly check a character string related to a plot description, and therefore operations are simple and efficiency is high when the user browses the video file.

For the effects of the implementations in this embodiment, refer to the effects of the corresponding implementations in the foregoing method embodiments. To avoid repetition, details are not described herein again.

The display apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a server, a Network Attached Storage (NAS), a Personal Computer (PC), a Television (TV), a teller machine, a self-service machine, or the like. This is not specifically limited in the embodiments of this application.

The display apparatus in the embodiments of this application may be an apparatus with an operating system. The operating system may be an Android operating system, may be an iOS operating system, or may be another possible operating system. This is not specifically limited in the embodiments of this application.

The display apparatus provided in the embodiments of this application can implement various processes implemented in the method embodiments of FIG. 1 to FIG. 4. To avoid repetition, details are not described herein again.

Figure 6:
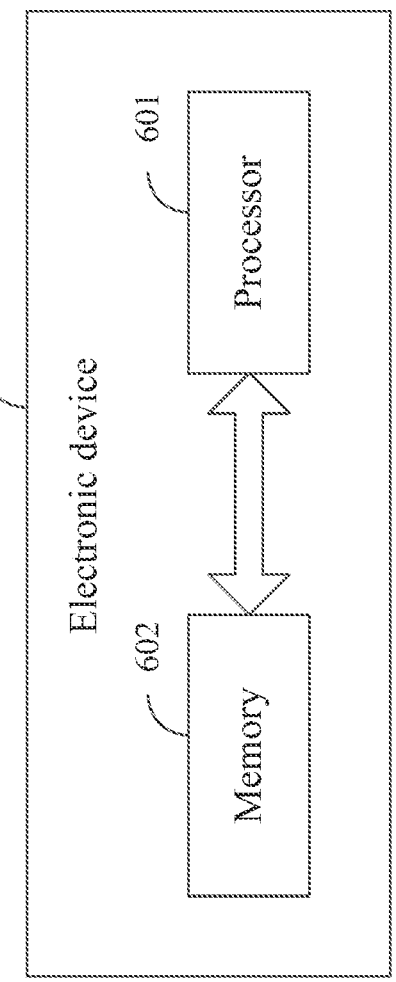
FIG. 6 is a first schematic structural diagram of an electronic device according to an embodiment of this application.

For example, as shown in FIG. 6, an embodiment of this application further provides an electronic device 600, including a processor 601, a memory 602, and a program or instructions stored in the memory 602 and capable of running on the processor 601. When the program or the instructions are executed by the processor 601, the processes of the foregoing display method embodiments are implemented, with the same technical effects achieved. To avoid repetition, details are not described herein again.

It should be noted that the electronic device in this embodiment of this application includes the foregoing mobile electronic device and the foregoing non-mobile electronic device.

Figure 7:
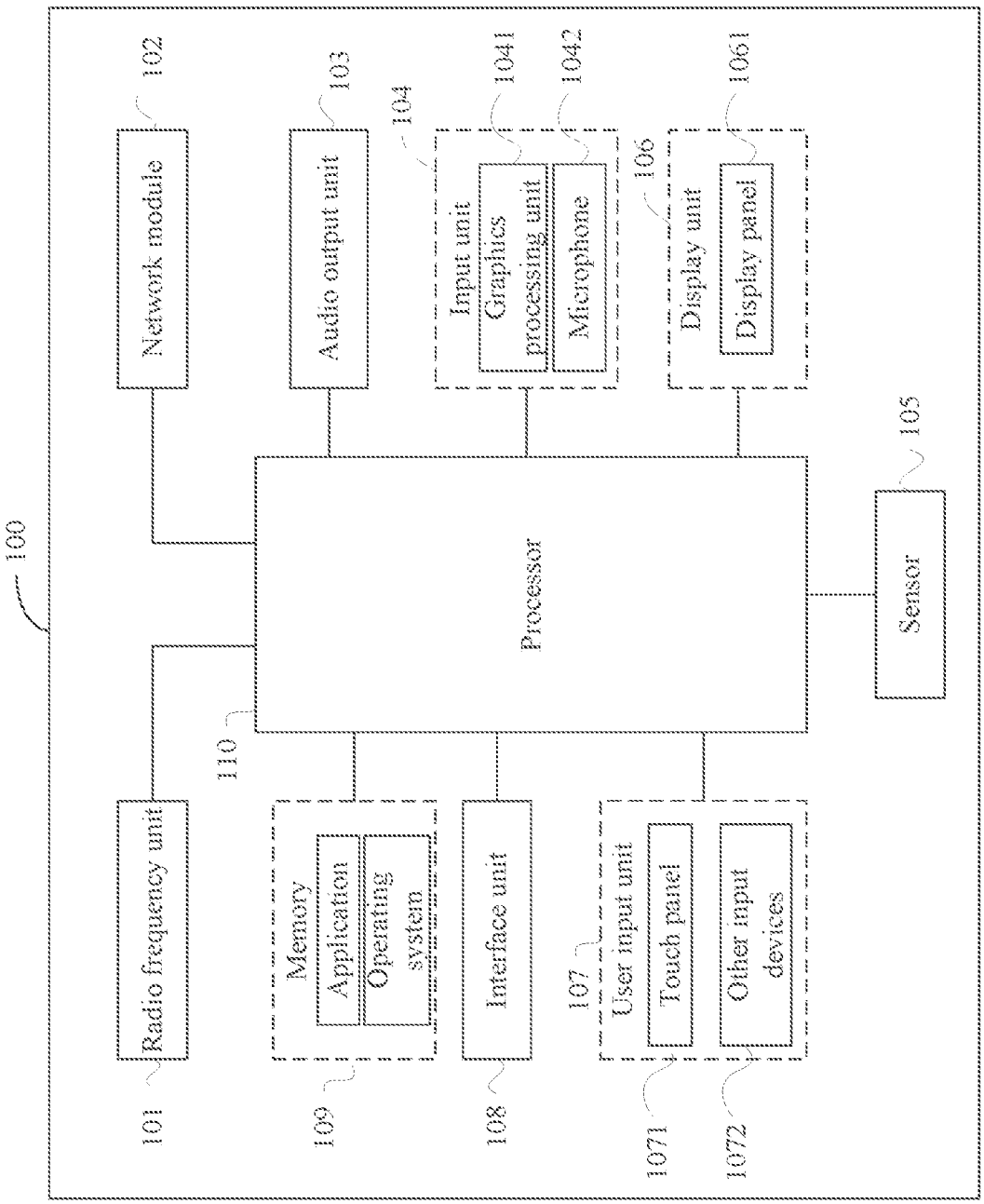
FIG. 7 is a second schematic structural diagram of an electronic device according to an embodiment of this application.

FIG. 7 is a schematic diagram of a hardware structure of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (for example, a battery) for supplying power to the components. The power supply may be logically connected to the processor 110 via a power management system. In this way, functions such as charge management, discharge management, and power consumption management are implemented via the power management system. A structure of the electronic device shown in FIG. 7 does not constitute a limitation on the electronic device. The electronic device may include more or fewer components than those shown in the figure, or a combination of some components, or the components disposed differently. Details are not described herein again.

The processor 110 is configured to: in a case that a first interface includes a first playback picture, determine whether a first character string satisfies a target condition, where the first playback picture includes the first character string, and the first playback picture is a playback picture of a target video at a first playback node. The display unit 106 is configured to: in a case that the processor 110 determines that the first character string satisfies the target condition, display a second character string on a second interface, where a second playback picture includes the second character string, and the second playback picture is a playback picture of the target video at a second playback node. The second playback node is a previous playback node of the first playback node.

For example, the target condition includes any one of the following: similarity between the first character string and the second character string is less than a first preset threshold, and a quantity of characters of the first character string is less than a second preset threshold.

For example, the second interface includes a third character string. The display unit 106 is further configured to: in a case that the processor 110 determines that the first character string satisfies the target condition, perform a target operation. The target operation includes any of the following: canceling display of the third character string on the second interface, and maintaining the display of the third character string on the second interface A third playback picture includes the third character string, and the third playback picture is a playback picture of the target video at a third playback node. The third playback node is a previous playback node of the second playback node.

For example, the display unit 106 is further configured to: in a case that display duration of the second character string is determined to be greater than or equal to preset duration, cancel the display of the second character string.

For example, in a case that the display apparatus includes a plurality of screens, and the plurality of screens include a first screen and a second screen, the first screen includes the first interface, and the second screen includes the second interface.

According to the electronic device provided in this embodiment of this application, in a case that the first interface includes the first playback picture, the electronic device may determine whether the first character string satisfies the target condition. The first playback picture includes the first character string, and the first playback picture is the playback picture of the target video at the first playback node. Then, in a case that the first character string satisfies the target condition, the electronic device may display the second character string on the second interface. The second playback picture includes the second character string, and the second playback picture is the playback picture of the target video at the second playback node. The second playback node is the previous playback node of the first playback node. In the foregoing solution, in a case that a user watches a video on the first interface of the electronic device and misses text related to a plot description, the electronic device in this application may determine whether the first character string in the first playback picture corresponding to the first playback node satisfies the target condition. In a case that the first character string satisfies the target condition, the electronic device displays, on the second interface, the second character string in the second playback picture corresponding to the previous playback node of the first playback node. In comparison with the solution in the related art and requiring the user to manually drag a video progress bar to trigger the electronic device to rewind to display the text, the electronic device in this embodiment of this application may directly display the second character string on the second interface without affecting the playing of the target video on the first interface, which does not require the user to manually drag the video progress bar to trigger the electronic device to rewind to display the second character string. In this way, it is convenient for the user to quickly check a character string related to a plot description, and therefore operations are simple and efficiency is high when the user browses a video file.

For the effects of the implementations in this embodiment, refer to the effects of the corresponding implementations in the foregoing method embodiments. To avoid repetition, details are not described herein again.

It should be understood that in this embodiment of this application, the input unit 104 may include a Graphics Processing Unit (GPU) 1041 and a microphone 1042. The graphics processing unit 1041 processes image data of a static picture or a video that is obtained by an image capture apparatus (for example, a camera) in an image capture mode or a video capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a functional key (such as a volume control key or a power on/off key), a trackball, a mouse, and a joystick. Details are not described herein. The memory 109 may be configured to store a software program and various data, including but not limited to an application program and an operating system. The processor 110 may be integrated with an application processor and a modem processor. The application processor mainly processes an operating system, a user interface, an application program, and the like. The modem processor mainly processes wireless communication. It can be understood that the modem processor may be not integrated into the processor 110.

An embodiment of this application further provides a readable storage medium. The readable storage medium stores a program or instructions. When the program or the instructions are executed by a processor, the processes of the foregoing display method embodiments are implemented, with the same technical effects achieved. To avoid repetition, details are not described herein again.

The processor is a processor in the electronic device in the foregoing embodiments. The readable storage medium includes a computer-readable storage medium, such as a computer Read-only Memory (ROM), a Random Access Memory (RAM), a magnetic disk, or an optical disc.

An embodiment of this application further provides a chip. The chip includes a processor and a communications interface, and the communications interface is coupled to the processor. The processor is configured to run a program or instructions to implement the processes of the foregoing display method embodiments, with the same technical effects achieved. To avoid repetition, details are not described herein again.

It should be understood that the chip mentioned in this embodiment of this application may also be referred to as a system-level chip, a system chip, a chip system, or a system-on-chip.

It should be noted that, in this specification, the terms "include", "comprise", or any of their variants are intended to cover a non-exclusive inclusion, such that a process, a method, an article, or an apparatus that includes a series of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a substantially simultaneous manner or in a reverse sequence depending on the functions involved. For example, the described method may be performed in an order different from that described, and various steps may be added, omitted, or combined. In addition, features described with reference to some examples may be combined in other examples.

According to the foregoing descriptions of the implementations, a person skilled in the art can clearly understand that the method in the foregoing embodiments may be implemented by software in combination with a necessary universal hardware platform or by hardware only. In some embodiments, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other forms without departing from the principle of this application and the protection scope of the claims, and all such forms fall within the protection scope of this application.

The invention claimed is:

1. A display method, performed by an electronic device, comprising:
    when a first interface comprises a first playback picture, determining whether a first character string satisfies a target condition, wherein the first playback picture comprises the first character string, and the first playback picture is a playback picture of a target video at a first playback node; and
    when the first character string satisfies the target condition, displaying a second character string on a second interface, wherein a second playback picture comprises the second character string, and the second playback picture is a playback picture of the target video at a second playback node, wherein
    the second playback node is a previous playback node of the first playback node,
    wherein the target condition comprises any one of the following: similarity between the first character string and the second character string is less than a first preset threshold, or a quantity of characters of the first character string is less than a second preset threshold.

2. The display method according to claim 1, wherein the second interface comprises a third character string; and
    the displaying a second character string on a second interface comprises:
    displaying the second character string on the second interface and canceling display of the third character string; or
    displaying the second character string on the second interface and maintaining display of the third character string, wherein
    a third playback picture comprises the third character string, the third playback picture is a playback picture of the target video at a third playback node, and the third playback node is a previous playback node of the second playback node.

3. The display method according to claim 1, wherein after displaying the second character string on the second interface, the method further comprises:
    when display duration of the second character string is greater than or equal to preset duration, canceling the display of the second character string.

4. The display method according to claim 1, wherein when the electronic device comprises a plurality of screens, and the plurality of screens comprise a first screen and a second screen, the first screen comprises the first interface, and the second screen comprises the second interface.

5. An electronic device, comprising a processor; and a memory having a computer program or an instruction stored thereon, wherein the program or the instruction, when executed by the processor, causes the processor to perform a display method comprising:
    when a first interface comprises a first playback picture, determining whether a first character string satisfies a target condition, wherein the first playback picture comprises the first character string, and the first playback picture is a playback picture of a target video at a first playback node; and
    when the first character string satisfies the target condition, displaying a second character string on a second interface, wherein a second playback picture comprises the second character string, and the second playback picture is a playback picture of the target video at a second playback node, wherein
    the second playback node is a previous playback node of the first playback node,
    wherein the target condition comprises any one of the following: similarity between the first character string and the second character string is less than a first preset threshold, or a quantity of characters of the first character string is less than a second preset threshold.

6. The electronic device according to claim 5, wherein the second interface comprises a third character string; and
    the displaying a second character string on a second interface comprises:
    displaying the second character string on the second interface and canceling display of the third character string; or
    displaying the second character string on the second interface and maintaining display of the third character string, wherein
    a third playback picture comprises the third character string, the third playback picture is a playback picture of the target video at a third playback node, and the third playback node is a previous playback node of the second playback node.

7. The electronic device according to claim 5, wherein after displaying the second character string on the second interface, the method further comprises:
    when display duration of the second character string is greater than or equal to preset duration, canceling the display of the second character string.

8. The electronic device according to claim 5, wherein when the electronic device comprises a plurality of screens, and the plurality of screens comprise a first screen and a second screen, the first screen comprises the first interface, and the second screen comprises the second interface.

9. A non-transitory computer readable storage medium, storing instructions that, when executed, causes the processor to perform a display method comprising:
    when a first interface comprises a first playback picture, determining whether a first character string satisfies a target condition, wherein the first playback picture comprises the first character string, and the first playback picture is a playback picture of a target video at a first playback node; and
    when the first character string satisfies the target condition, displaying a second character string on a second interface, wherein a second playback picture comprises the second character string, and the second playback picture is a playback picture of the target video at a second playback node, wherein
    the second playback node is a previous playback node of the first playback node,
    wherein the target condition comprises any one of the following: similarity between the first character string and the second character string is less than a first preset threshold, or a quantity of characters of the first character string is less than a second preset threshold.

10. The non-transitory computer readable storage medium according to claim 9, wherein the second interface comprises a third character string; and
    the displaying a second character string on a second interface comprises:

displaying the second character string on the second interface and canceling display of the third character string; or displaying the second character string on the second interface and maintaining display of the third character string, wherein a third playback picture comprises the third character string, the third playback picture is a playback picture of the target video at a third playback node, and the third playback node is a previous playback node of the second playback node.

11. The non-transitory computer readable storage medium according to claim 9, wherein after displaying the second character string on the second interface, the method further comprises:

when display duration of the second character string is greater than or equal to preset duration, canceling the display of the second character string.

12. The non-transitory computer readable storage medium according to claim 9, wherein when an electronic device comprises a plurality of screens, and the plurality of screens comprise a first screen and a second screen, the first screen comprises the first interface, and the second screen comprises the second interface.

* * * * *